United States Patent
Stucki et al.

(10) Patent No.: US 9,906,263 B2
(45) Date of Patent: Feb. 27, 2018

(54) METHOD AND SYSTEM FOR INFORMATION TRANSMISSION

(75) Inventors: Andreas Stucki, Grut (CH); Andreas Martin Haberli, Bubikon (CH)

(73) Assignee: DROMAKABA SCHWEIZ AG, Wetzikon (CH)

(*) Notice: Subject to any disclaimer, the term of this patent is extended or adjusted under 35 U.S.C. 154(b) by 1557 days.

(21) Appl. No.: 12/295,690

(22) PCT Filed: Mar. 30, 2007

(86) PCT No.: PCT/CH2007/000166
§ 371 (c)(1),
(2), (4) Date: Jan. 7, 2009

(87) PCT Pub. No.: WO2007/112609
PCT Pub. Date: Oct. 11, 2007

(65) Prior Publication Data
US 2009/0161734 A1    Jun. 25, 2009

(30) Foreign Application Priority Data
Apr. 3, 2006 (CH) .......... 548/06

(51) Int. Cl.
*H04B 1/00* (2006.01)
*H04B 1/707* (2011.01)

(52) U.S. Cl.
CPC .................. *H04B 1/707* (2013.01)

(58) Field of Classification Search
None
See application file for complete search history.

(56) References Cited

U.S. PATENT DOCUMENTS

| | | | |
|---|---|---|---|
| 4,591,845 A | | 5/1986 | Komatsu et al. |
| 4,876,535 A | * | 10/1989 | Ballmer et al. ............. 340/5.8 |
| 5,515,853 A | * | 5/1996 | Smith et al. ............... 600/437 |
| 5,796,827 A | | 8/1998 | Coppersmith et al. |
| 5,914,701 A | | 6/1999 | Gersheneld et al. |
| 6,127,939 A | * | 10/2000 | Lesesky ............. B60R 16/0315 303/122 |
| 6,198,919 B1 | * | 3/2001 | Buytaert et al. .......... 455/426.1 |
| 6,301,311 B1 | | 10/2001 | Sheba |
| 6,730,034 B1 | * | 5/2004 | Lang et al. ................. 600/449 |
| 7,012,546 B1 | * | 3/2006 | Zigdon ................. H04B 1/707 340/870.01 |
| 7,023,817 B2 | | 4/2006 | Kuffner et al. |

(Continued)

FOREIGN PATENT DOCUMENTS

| | | |
|---|---|---|
| EP | 0762333 | 3/1997 |
| EP | 0 843 425 A2 | 5/1998 |

(Continued)

*Primary Examiner* — Shuwang Liu
*Assistant Examiner* — Gina McKie
(74) *Attorney, Agent, or Firm* — Rankin, Hill & Clark LLP

(57) ABSTRACT

The invention relates to the information transmission between a data-transmitting apparatus and a read- and/or write module, in particular for the use of access control. According to the invention, data to be transmitted is represented as a digital signal by the data-transmitting apparatus, and this signal is converted into an ultra-broadband signal by way of the spread spectrum method, and capacitively and/or resistively transferred via the body of the user to the write- and/or read module.

32 Claims, 7 Drawing Sheets

(56) References Cited

U.S. PATENT DOCUMENTS

| | | | |
|---|---|---|---|
| 2003/0072445 A1* | 4/2003 | Kuhlman et al. | 380/42 |
| 2003/0161411 A1* | 8/2003 | McCorkle et al. | 375/295 |
| 2005/0117628 A1* | 6/2005 | Brethour et al. | 375/130 |
| 2005/0151623 A1* | 7/2005 | von Hoffmann | 340/5.61 |
| 2006/0256910 A1* | 11/2006 | Tal et al. | 375/376 |

FOREIGN PATENT DOCUMENTS

| | | |
|---|---|---|
| JP | 7-506902 | 7/1995 |
| JP | 9-297862 | 11/1997 |
| JP | 2002-537681 | 11/2002 |
| WO | 93/23767 | 11/1993 |
| WO | 98/26508 | 6/1998 |
| WO | 2004/082304 | 9/2004 |
| WO | 2005/124667 A1 | 12/2005 |

\* cited by examiner

METHOD AND SYSTEM FOR INFORMATION TRANSMISSION

BACKGROUND OF THE INVENTION

Field of the Invention

The invention relates to a method for transmitting information from, for example, a portable apparatus to a write- and/or read module, to a system for carrying out this method, to a data-transmitting apparatus as well as a to write- and/or read module.

Description of Related Art

A multitude of channels are available for transmitting information signals, in particular digital signals, between transmitters and receivers. Such a channel is the capacitive (more precisely: capacitive/resistive) coupling between a portable apparatus and a write- and read module. The application of such a coupling is of particular interest when it is effected via the human body as a transmission medium. Corresponding systems are disclosed for example in the U.S. Pat. No. 4,591,845, the U.S. Pat. No. 5,914,701 and the U.S. Pat. No. 5,796,827. A user carries a portable apparatus with him. Information flows as soon as the user touches a touch surface coupled to a read- and write module, or is located in the direct vicinity of the touch surface. For example, an unambiguous access code may be transmitted from the portable apparatus to the write- and read module.

For practical applications, in particular for access control in its broadest sense, the following demands arise, which in combination are not met by any existing system, and which until now have prevented a commercial breakthrough of this type of information transmission:
A. Signal-to-noise ratio: A favorable signal-to-noise ratio is only possible with a large amplitude of the transmission signal. Fluctuations of potential which exist in the—high-resistance—human body and which are impressed by electrical apparatus, are of an absolute value of a few 100 mV, in the range of up to 1 MHz. A much larger signal amplitude (i.e. high voltage on the body) for a transmission system is however not tolerated by the user. The method should therefore also function with unfavourable signal-to-noise ratios.
B. Inexpensive components of the portable apparatus: Whereas the simplest of passive components are sufficient for example for RFID-information transmission, a portable apparatus for capacitive transmission must comprise an active transmitter with a voltage source, and there exists the problem of synchronisation with the receiver. Precise clock generators (crystal or likewise) are however expensive, and the synchronisation effort increases with less precise clock generators.
C. Speed: the complete information transmission process including synchronisation should last a few seconds at the most, even better less than one second, and at the most 300 ms or at the most 200 ms, depending on the application.

It has already been suggested in the U.S. Pat. No. 5,914,701 to apply the direct-sequence spread spectrum modulation method for information transmission. The noise sensitivity (in particular the interference sensitivity is meant by this) is reduced by way of this, and it becomes possible for several transmitters to be simultaneously active, wherein each transmitter has its own modulation code (spreading code). Indeed, the spread spectrum method which per se has been known for some time, as known, is suitable for reducing the interference-proneness of signals and for coding the signals in a receiver-specific manner. However, disadvantages also result: the computation efforts at the write- and/or read module, and the synchronisation effort at the portable apparatus, are considerable. The mentioned document U.S. Pat. No. 5,914,701 does not suggest how the synchronisation may be accomplished without compromising the demands B and C. Furthermore, depending on the application, it may also be disadvantageous if it is simultaneously possible for several portable apparatus to communicate with the write- and/or read module. For example, for the application of a "secure access control", one should rather ensure that the data received by the write and/or read module only originates from that user who is located in the direct vicinity of an operating surface of the module, and touches this for example.

BRIEF SUMMARY OF THE INVENTION

Proceeding from this state of the art, it is the object to provide a method for information transmission by way of which the disadvantages of the state of the art are overcome, and which at least partly meets the demands A to C. The method should preferably have the advantages of capacitive intrabody information transmission via the human body, and be able to ensure that data received by a write- and/or read module originates from that portable apparatus which the user located in the direct vicinity of the module carries on him.

This object is achieved in that the data to be transmitted is represented as a digital signal by an (often portable, carried by the user) apparatus, and this signal is converted into an ultra-wideband signal by way of the spread spectrum method, and capacitively and/or resistively—via the body of the user or in a direct manner—is transferred to a write- and/or read module.

The capacitive and/or resistive signal transmission via the human body is to be understood as the signal transmission between a transmitter and a receiver, wherein via a transmitter interface, a signal may be coupled from the transmitter into the body, and from the body into a receiver interface. The coupling through the body is effected primarily in a resistive manner. The coupling between the transmitter- and the receiver interface is primarily capacitive or primarily resistive, or a combination of both, depending on the situation. A primarily resistive coupling between the interface and the body is effected when the interface comprises an electrode which is directly touched by the body; otherwise it is generally capacitive components which dominate. This type of signal transmission via capacitive and/or resistive coupling is also called intrabody signal transmission. Intrabody signal transmission is primarily modelled by capacitive coupling in the literature (in particular in U.S. Pat. No. 5,914,701).

Ultra-wideband is defined as the use, for the information transmission, of a frequency range of a bandwidth of at least 20% of the center frequency, or of at least 500 MHz. Transmission frequencies of more than 100 MHz are disadvantageous or may not be realised for the method according to the invention, so that hereinafter "ultra-wideband" is to be equated with "at least 20% of a middle transmission frequency", i.e. as the case may be, "at least 20% of a carrier frequency".

Spread spectrum modulated, ultra-wideband signals, according to the state of the art, are used where interferences with other transmission channels are to be prevented (for example in personal area networks). Such signals are (for example UTMS) also used, in order to be able to communicate with a large number of users simultaneously and without any collisions. By way of the invention, one utilises the new insight, that the transmission of a spread spectrum modulated, ultra-wideband signal may also be advantageous for point-to-point transmissions without interfering, other information channels—with such point-to-point transmissions—it is the case of the capacitive and/or resistive transmission by the human body.

It has been found, that the capacitive and/or resistive transmission of an ultra-wideband signal is advantageous, in particular with regard to the signal-to-noise ratio at small voltage amplitudes. In particular, the procedure according to the invention permits one to operate with voltage amplitudes of a few mV in the body—corresponding, for example, of up to 3V or less on electrodes—, which is below fluctuations of potential which are coupled into the human body by electronic apparatus in any case. The procedure according to the invention permits the signal, as a pseudo-noise-signal, to "disappear" (e.g. by a factor of 10), in the noise or interference, and therefore causes no measurable influence of the flows of current in the human body.

With the implementation of the device according to the invention, therefore, it is also preferable for an amplitude at the coupling electrodes of 5 V, and particularly preferably 3 V not to be exceeded.

Preferably, the "direct sequence-spread spectrum method" is used. The code frequency (chipping frequency) then, on account of the definition of "ultra-wideband", is for example, at least a fifth of the signal center frequency, preferably at least half the signal center frequency. In the particularly preferred case, the chipping frequency is equal to the modulation frequency, and thus, to the center frequency.

The data word before the spreading, may be modulated with a method of digital data modulation. One example of this is the phase shift keying method (PSK), in particular the binary phase shift keying method (BPSK), or also a quadrature- or other phase shift keying method. Preferably, such a data modulation method is combined with a coding which renders the signal insensitive with respect to the absolute phase, for example by way of only looking at phase differences (differential encoding). In the example of PSK, this in combination results in a DPSK (differential phase shift keying), for example a DBPSK-modulation. This method in combination with the procedure according to the invention, entails the advantage that the absolute phase does not need to be known. Rather, with the differential phase shift keying, it is only the relative phase between a symbol and the respective next symbol which is of significance. One may also use a different, for example error-correcting code with similar characteristics, for example a rotation-invariant code, as an alternative to differential coding.

Preferably, the data word contains one bit or several bits, which on the part of the receiver permit a consistency check (check-sum test in the broadest context), for example a cyclic redundancy check. This is particularly preferred in combination with differential coding or rotation-invariant codes: By way of applying the consistency check to the obtained data, one may determine as to whether an artefact was obtained instead of a data word, on decoding by way of systematic phase angle rotations between two adjacent code symbols. Such systematic phase angle rotations may arise on account of a non-fixed relationship between, on the one hand the frequency of the carrier oscillation modulated on the part of the transmitter, and the sampling frequency (as the case may be, with phase correction of the code used in the receiver). If the consistency check (for example CRC check) results in a lacking consistency, then the obtained symbol sequence is rejected, and a renewed evaluation is carried out with a systematic phase angle rotation—for example by $\pi/2$—from symbol to symbol.

Alternatively, to differential phase shift keying, one may also carry out a different modulation, for example a (non-differential) phase shift keying (PSK-modulation), a different modulation or even no modulation. In such a case, under certain circumstances, the absolute phase of the received signal must be known. One may, for example, use a phase locked loop (PLL) as is known per se from the state of the art, for determining an absolute phase and frequency of the received signal. Although this entails a relatively large effort and a certain control-in time, this embodiment is practical or even preferred, depending on the application.

According to the invention, the de-spreading (the inverse operation for spread spectrum modulation carried out on the part of the receiver) is particularly preferably combined with the demodulation. According to the state of the art, modules for spreading and de-spreading on the one hand, and the modulation and demodulation on the other hand, are independent of one another. This is illustrated in FIG. 11, where a method is shown, as is for example applied to contactless data transmission. Data ("data") to be transferred, is firstly modulated, for example with the PSK-method, wherein this modulation may also be understood as a coding. Subsequently, the spreading and the modulation onto a carrier frequency are effected. The inverse sequence takes its course on the part of the receiver. This procedure has the advantage that standard components may be used, i.e. for example a spreader/de-spreader known per se may also be used for a newly developed system. A newly suggested combination according to the preferred embodiment of the invention however has the advantage that no separate synchronisation procedures are necessary for the de-spreading and the demodulation, which is advantageous for the operation in burst-mode. Rather, the signal acquisition carried out for the de-spreading is also used for the demodulation. The de-spreading directly delivers code symbols, which under certain circumstances yet need to be decoded/demodulated (inverse operation of modulation, for example DPSK-modulation), for which however synchronisation is no longer necessary. This embodiment requires the existence of a fixed, predefined relation between the bit frequency and the chipping frequency. A chipping sequence (a code cycle), particularly preferably, has exactly the length of a code symbol.

Preferably, the signal is modulated onto a carrier signal after the spread spectrum modulation and before the transfer. As already mentioned, the carrier frequency may be equal to the chipping frequency. The modulation onto a carrier signal has the advantage, that a large part of the signal power occurs in a frequency range which is sufficiently distanced from the very low frequencies (50 Hz etc.), which are prone to interference. The embodiment examples described hereinafter, all include the modulation to a carrier even if this is not a necessary precondition for the invention, and the spread spectrum modulated signal (with regard to information technology, it corresponds to a basis-band signal) may also be transferred directly—as the case may be—after a suitable filtering with a low-pass filter.

It is possible to transmit with the method according to the invention, in a burst-mode, i.e. immediately and without time-consuming synchronisation steps. The acquisition (synchronization) and the tracking require a higher signal-to-noise ratio than the actual receiving. For this reason, according to a preferred embodiment, the codes are added up and averaged ("combining"). In order not to have to rely on a pilot sequence (preamble for example), the codes are averaged with the help of a combiner not aided by data (non data aided, NDA). This necessitates the estimation of the code symbols, for example with a DPSK-demodulator.

Preferably, when combining, at least two preferably directly consecutive signal sequences of the—under certain circumstances estimated—length of a data bit are correlated in each case with the stored code, and the results are added adjusted for the code symbol value. The added value may then be used in order for the acquisition and the tracking, to obtain signals with a particularly good signal-to-noise ratio. Tracking is to be understood as the tracking of the receiver with regard to the transmitter frequency. This may be effected, for example, by way of the early-late-gating method. The adjustment for the sign, with PSK-modulation, is preferably effected by way of a multiplication by a DPSK-demodulation value, which estimates the relative "sign" or the relative complex argument of two data signals (according to code symbols).

One may also envisage the data word to be transmitted, being sent out in a continuously repeated manner, so that a constant bit flow is transmitted. The receiver may be designed such that the recording of the data word may set in at any starting point in time, thus as soon as the receiver has recognised and acquired an incoming signal. The combination of these measures ensures that the transmission and recording of data may set in at an earliest possible point in time. There is then practically no temporal delay between the point in time at which the receiver recognises that a signal arrives, and the beginning of the data recording.

Alternatively or supplementary to this, one may of course also envisage the apparatus transmitting data-containing means, the effect of which is that the signal is only emitted temporarily. These may include the manual activation of the apparatus, the activation by way of a movement detector, a suitably designed wake-up circuit or any other means.

According to a special embodiment, a plurality of simultaneously applicable correlators are available for the correlation method. With this, one may take account of the condition that the frequency relation between the chipping frequency on the transmitter side, and the sampling frequency on the receiver side, under certain circumstances, is not precisely known—specifically when the clock generator of the transmitter is not very accurate. Virtually, different chipping frequencies are tested out with the different correlators. A significant correlation only occurs with the matching chipping frequency, and at most with adjacent frequencies. The different correlators may correspond to a imaginary sampling signal of a chipping code with different sampling frequencies (or—which is equivalent and comes to the same thing—to the imaginary sampling signals of chipping codes with different chipping frequencies with a fixed sampling frequency). This means that the length and phase of the different correlators are adapted to the respective frequency shift. Typically, the correlators are quantisised in a receiver sampling interval, preferably ½ of the chipping length (corresponding to double the chipping frequency).

According to a first variant, this plurality of correlators— the correlator bank—covers the complete width of the chipping frequency uncertainty. The acquisition may then take its course in a completely parallel manner. As a further alternative, the correlator bank may only cover a part of the possible frequency inaccuracy, and the sampling frequency or, which equivalent to this, the correlator bank as a whole, may then be changed in steps over the whole width of possible frequencies, until a correlator results in significant data signals (code symbols) (partly parallel acquisition).

A correlator bank may be fixed and have a fixed frequency relation to the—fixed—sampling frequency. Alternatively, one may provide a fine tuning, according to which the sampling frequency is slightly adapted based on correlation values (obtained for example from the tracking).

According to an alternative embodiment, which is particularly suitable for systems with comparatively accurate clock generators on the part of the transmitter, one uses only a single correlator. This may be used together with a fixed sampling frequency in the case of a sufficiently large precision. Alternatively, the sampling frequency may be changed in steps over a certain region, until significant data signals are found.

Two criteria are available for the acquisition, of which at least one, preferably both are applied: an amplitude- or absolute value criterion, and a time criterion. The amplitude- or absolute value criterion is based on a comparison of an—assumed—absolute value maximum (peak) with a noise level. If the average noise level has been exceeded by a certain threshold value—of typically between 2 and 5 dB—then a code symbol is presumed. Two consecutive peaks fulfil the time criterion when the temporal distance corresponds at least roughly to a bit length. A bit length is simultaneously a correlator- (code-)-length or defined fraction therefore.

If several correlators are present, the signal is searched for peaks, not only as a function of time, but also as a function of the correlator or its number. Yet a third criterion results for the acquisition: different peaks should be assigned to the same correlator or at the most to adjacent correlators, since the transmitter frequency must be roughly constant over the message (burst) length, i.e. it may not be the case that the chipping frequency greatly changes between different bits.

The invention is particularly preferably carried out, such that from the very beginning, one may rule out more than one portable apparatus (as a transmitter) participating in a data exchange. This may be ensured for example by way of the transmission frequency (or the center frequency) being smaller than 10 MHz, advantageously not larger than 2 MHz, particularly preferably not larger than 1 MHz. Additionally, the transmitting power should be so small, that the capacitive-resistive coupling only functions at small distances. The fulfilment of these conditions is of particular interest for the application of a "secure access control". Then specifically, the condition that the signal radiation (the information transmission past the human body as a transmission medium so to say) may not be measured, is fulfilled. It is then ensured that the information received by the receiver does indeed originate from the portable apparatus which the user touching the operating surface or located in its direct vicinity, carries on him. On the other hand an electrode emitting signals would also act as an antenna at higher frequencies than those specified.

The invention also relates to a system for transmitting data, which comprises at least one data-transmitting (for example portable) apparatus and at least one write- and/or read module. A corresponding data-transmitting (for example portable) apparatus and a write- and/or read module are likewise subject-matter of the invention. The apparatus contains two electrodes between which a time-dependent electrical voltage may be applied such that the smallest of currents flow in the human body of the user, when one of the two electrodes is arranged in the direct vicinity of the body, and the other one somewhat distanced thereto. The write- and/or read module includes a detector which detects an electrical voltage or electrical currents between a first and a second electrode. The first electrode is generally arranged such that in the operating condition, it is located in the direct vicinity of the human body of the user. It may for example be designed as an operating surface, as a handle surface, a door knob etc. A conductive plate may, for example, serve as a second electrode. The currents in the body of the user in the operating condition effect a capacitive and/or resistive coupling between the electrodes of the data-transmitting apparatus, and those of the write- and/or read module.

The apparatus is then controlled such that the time-dependent, electrical voltage sends out an ultra-wideband spread spectrum modulated signal in the operating condition. The write- and/or read module has a data-acquisition- and decoding unit, which decodes an incoming spread spectrum modulated, ultra-wideband signal The system according to the invention, the apparatus according to the invention and the write- and/or read module according to the invention may be designed such that they may execute the method according to any of the above described or subsequently described embodiments.

Preferred embodiments of the invention are hereinafter described in detail by way of the drawings. Thereby, there are shown in:

DETAILED DESCRIPTION OF THE INVENTION

Figure 1:
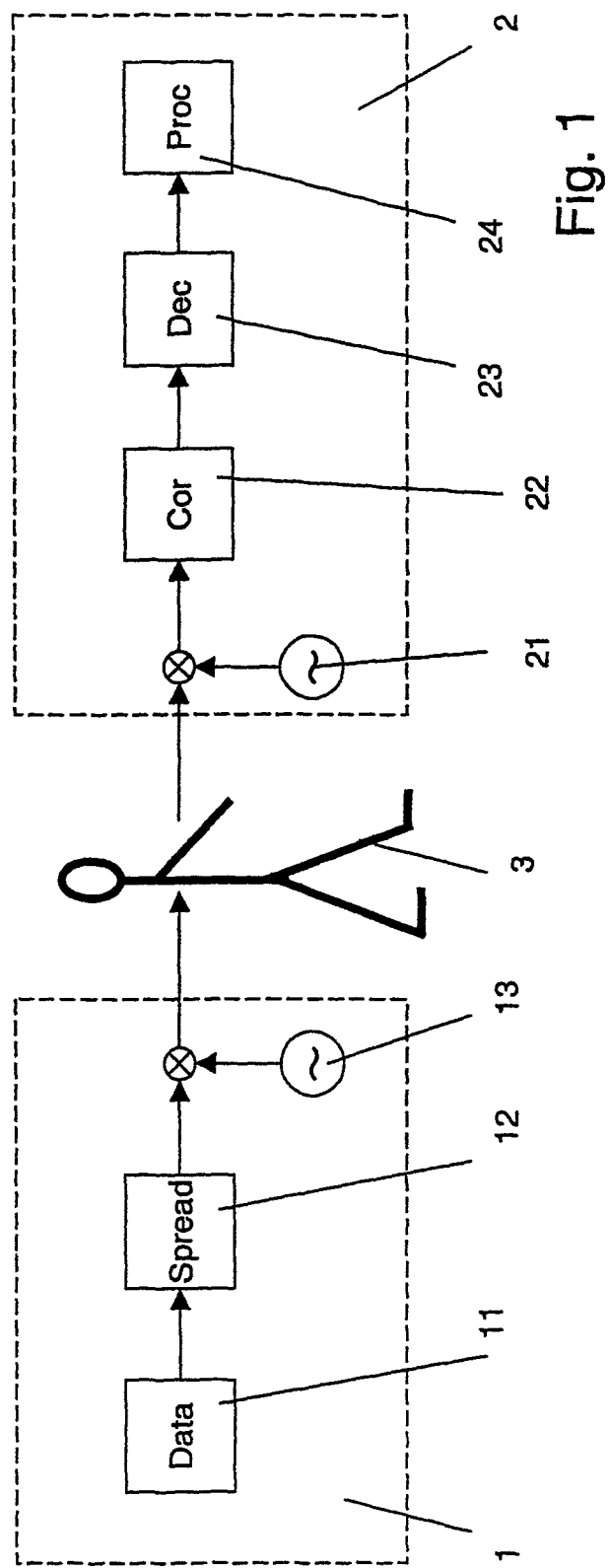
FIG. 1 a schematic diagram of one embodiment of the method according to the invention, FIG. 2 the method steps taking their course in the portable apparatus, according to one design of the method according to the invention, FIG. 3 the processing of the received signal in the write- and/or read module, up to the sampling, according to one design of the method according to the invention, FIG. 4 the processing of the sampling signal in the write- and/or read module, according to one design of the method according to the invention, FIG. 5 the processing of the sampling signal in the write- and/or read module, according to an alternative design of the method according to the invention, FIG. 6 one design of the signal acquisition, for the method according to the invention, FIG. 7 one design of the tracking, FIG. 8 one design of the decoding of the code symbols, FIG. 9 a schematic representation of the "combining signal" as a function of time, FIG. 10 very schematically, one system according to the invention, with a portable apparatus according to the invention, and with a write- and/or read module according to the invention, FIG. 11 a schematic representation of a system for the information transmission by way of radio waves, according to the state of the art.

The system according to FIG. 1 comprises a data-transmitting, portable apparatus 1 and a write- and/or read module 2. These have the ability of communicating with one another in a capacitive and/or resistive manner via the body of a user 3, or via direct capacitive/resistive coupling between the transmitter and the receiver. The latter is the case, for example, when the user holds a tag for reading out, directly onto a receiver electrode connected to the receiver.

According to the invention, whilst using the spread spectrum method, data as an ultra-wideband signal is transferred capacitively and/or resistively from the portable apparatus via the body of a user, to a write- and/or read module. The data 11 may, for example, be digitally present in an EEPROM-memory, and be subjected to the spread spectrum method 12 for the data transfer, whereupon it is modulated onto a carrier signal 13. The spread spectrum modulation may for example be designed as a direct sequence spread spectrum method, and therefore contains the modulation with a periodically repeated chipping sequence. The chipping sequence is of the type of a pseudo-random bit sequence and is also called code, spreading code or chipping code. The time duration $T_c=1/f_c$ of an individual chip is smaller than the symbol length (bit period) $T_B=1/f_B$ ($f_B$=bit frequency).

Other designs of the spread spectrum method are also conceivable, for example the frequency hopping method or pulse position modulation method. Hereinafter, embodiments of the method according to the invention are discussed, which are based on the direct sequence spread spectrum method.

Short codes, i.e. codes of a length for example of 10 $T_B$ at the most are particularly preferred for the direct sequence spread spectrum modulation, and particularly preferably codes of the length $T_B$. No measures for CDMA (code division multiple access) are provided in most embodiments.

Data is again multiplied by a signal 21 of the carrier frequency (demodulation) in the write- and/or read module, whereupon the received signal is synchronised with a code signal produced in the write- and/or read module, by way of a correlator 22. A decoding 23 (i.e. the production of a bit-sequence from the received signal) subsequently follows, whereupon the decoded data is processed in a data processing unit 24.

The processing of the data may for example consist of the verification of an identification code: on agreement—in the application example of access control—the release of a property is effected, for example by a control signal to a mechatronic unit. The processing of the data, alternatively to this, however may yet contain one or more further steps, and/or steps other than merely the verification of a code. Furthermore, one may initiate a further data exchange via the capacitive and/or resistive information transmission and/ or via other channels. The capacitive and/or resistive information transmission as a whole is typically unidirectional, possibly other channels may likewise be unidirectional, or permit an information transmission in the other direction or a bi-directional information transmission. For example, the transfer of a message in the way described here, may serve for building up a communication channel (in a capacitive-resistive manner and/or in a different way). Examples of information transmission methods are also described in the international patent application PCT/CH 2006/000518, which is expressly referred to here.

Hereinafter, implementations of the method according to the invention in a write- and/or read module are described by way of exemplary embodiments by way of FIGS. 2 to 8. Thereby, the following problem tasks are dealt with:

1. A direct sequence spread spectrum modulated signal arrives at the receiver as a sequence of chips. If the ratio between the chipping frequency and bit frequency is N, then N chips thereby form a code signal, and all N chips begin a new code symbol. In order to be able to read the data at all, the receiver must ascertain where, in each case, a new code symbol begins in an arriving chip sequence, in order to obtain a bit sequence by way of chipwise multiplication (or—depending on the representation/resolution of the data by way of an XOR-operation) by the chipping code also stored at the receiver. The procedure of the recognition of the code symbols of a bit length in a chip sequence is hereinafter called "acquisition", and a procedure of the chipwise multiplication (or XOR-operation) carried out for the acquisition, and addition of the code with chip part-sequences is called "correlation". The averaging of the results of the correlation with different chip part-sequences, which is purified of code symbol values, is called "combining".

2. Systematic, time-dependent deviations which are not caused by signal and which may be represented as rotations of number values in the complex plane, result with the sampling signal given an imperfect synchronisation between the carrier frequency generator on the transmitter side, and the sampling frequency generator on the receiver side. This situation must be taken into account with each operation with which consecutive symbols are compared to one another. All multiplication is to be understood as complex in the following description. In this context the "phase" of a value indicates the argument of the complex value.

3. Specifically, these systematic deviations have an affect with DPSK-demodulation, where artefacts may arise when the systematic deviation from symbol to symbol is π/2 or more.

Figure 2:
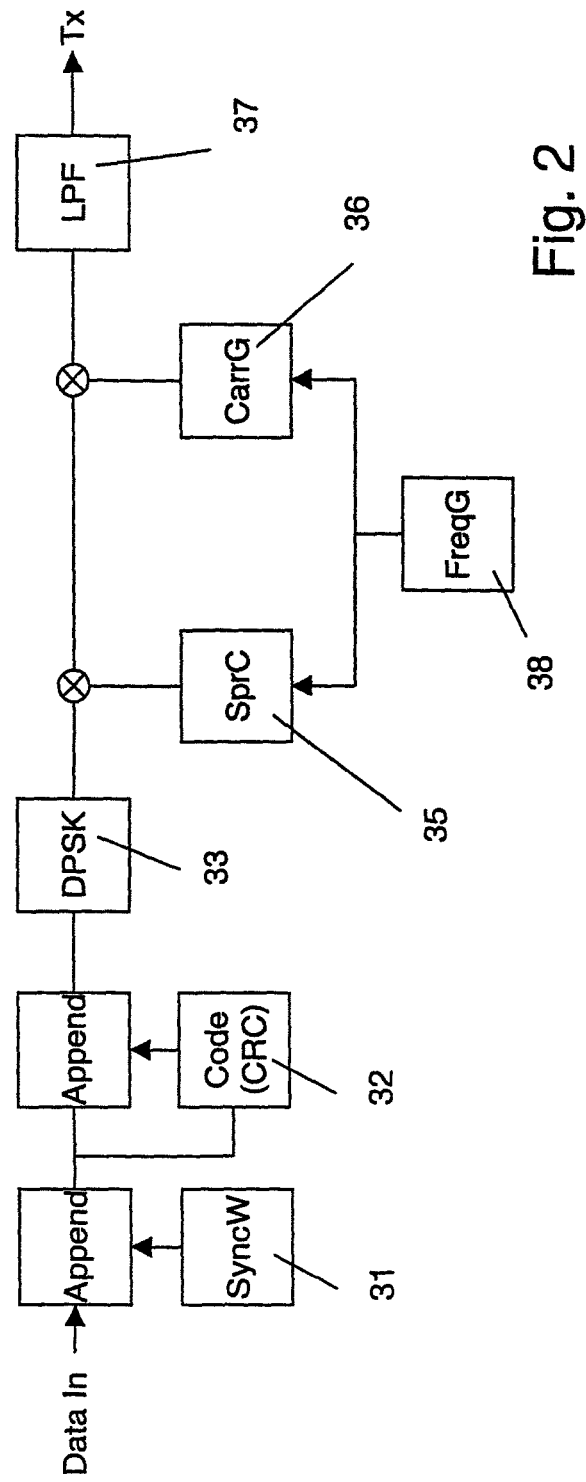

FIG. 2 shows the implementation of an embodiment of the method according to the invention in the portable apparatus.

The data to be sent ("data in") is, for example, called up from a data memory of the portable apparatus. It consists, for example, of a short bit-sequence of, for example, between 40 and 500 data bits, particularly preferably 150 or less data bits. An introductory or concluding "sync-word" 31—a bit sequence known by the user from the start—may be joined to the bit sequence.

The bit sequence may be coded in a cyclic manner as a possible alternative to joining a "sync-word". The cyclic coding has the advantage that the method may take its course more rapidly on decoding (as will be made yet more clear by way of the subsequent description of FIG. 8).

The data for the error recognition and/or error connection is coded in a further step 32. This may, for example, be effected, for example, by way of joining on at least one CRC-bit as a CRC-word which permits a cyclic redundancy check (CRC). One may also apply other methods instead of a CRC check, which may check and/or correct the consistency of the received data. Systematic or non-systematic codes are possible.

The whole sequence of bits—including the optional constituents "sync-word" and coding-bit(s) are hereinafter called "data word".

Preferably, the data word is sent out in a continuously repeated manner at least during a transmitting period, i.e. an uninterrupted bit flow arises. The drawing-up of the data word by the receiver may begin at any starting point in time, which is yet to be explained hereinafter.

With the method described here, a modulation with the method of differential phase shift keying DPSK-method is effected in a next step 33. The digital signal which has arisen, is then multiplied by a—generally pseudo-random—chipping code 35, and thereupon modulated to the carrier signal 36. Finally, a low-pass filter 37 is yet (optionally) arranged on the output side, by way of which frequencies of more than double the carrier frequency (for the case that $f_C \approx f_{Carrier}$) or of more than $f_C + f_{Carrier}$ are clipped. In the case that the chipping frequency is smaller than the carrier frequency, a bandpass filter is advantageously used instead of a low-pass filter 37. The emitted signal is indicated in the figure at Tx.

A (single) clock generator 38 is available for producing the chipping code 35, and the production of carrier signals 36.

The joining-on the sync-word, the computation of a CRC-code, the DPSK-modulation, and possibly even (as the case may be) the up-sampling, the spreading, and the (then digital) modulation onto the carrier, or also only one or more of these steps, may be computed in advance, and do not need to be effected "online" during the data transmission.

The receiver may comprise a wake-up circuit, which is not represented in the figures. This ascertains when an increased signal level is present at the input electrode, which is the case when a user is located in the direct vicinity of the electrode or touches this. The user functions quasi as an antenna for electromagnetic radiation, primarily in the frequency range between 50 Hz and 100 kHz, and by way of this effects an increase of the "noise" level (actually it is an interference level, since with the captured signals, it is not the case of noise in the literal meaning of the term). The actual receiver electronics are set into operation only after the wake-up circuit has ascertained such an increased signal level.

A wake-up circuit of the receiver may also be based on other principles. For example, alternatively to the above, one may envisage the circuit being woken up by the signal instead of by the noise-/interference level. The wake-up may contain two circuit elements as yet a further alternative. A first one reacts to the noise/interference level, whilst a second one selectively searches for the receipt of a signal, wherein depending on the situation, the one or the other wake-up circuit sets the receiver into action, or wherein after ascertaining an increased noise/interference level by the first wake-up-circuit, the receiver is only activated when the selective wake-up circuit set in action also ascertains the presence of a signal.

Figure 3:
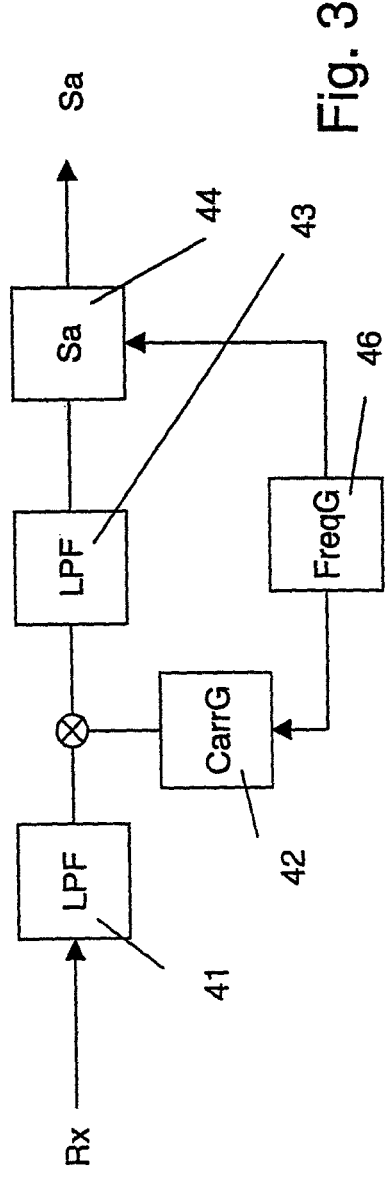

FIG. 3 shows the input-side processing of the signal Rx which is received at the electrode and transferred through the body in a capacitive and/or resistive manner. A low-pass filter 41 on the input side has the same cut-off frequency as the low-pass filter 37 of the portable apparatus, and trims noise components which lie above the cut-off threshold. A second low-pass filter 43 may be arranged after demodulation by way of renewed multiplication by a carrier signal 42, and the cut-off frequency of this second low-pass filter corresponds to the chipping frequency $f_C$. The obtained signal is sampled (step 44), wherein the sampling frequency is preferably $2*f_C$. A clock generator 46 is also present on the part of the write- and/or read module.

Figure 4:
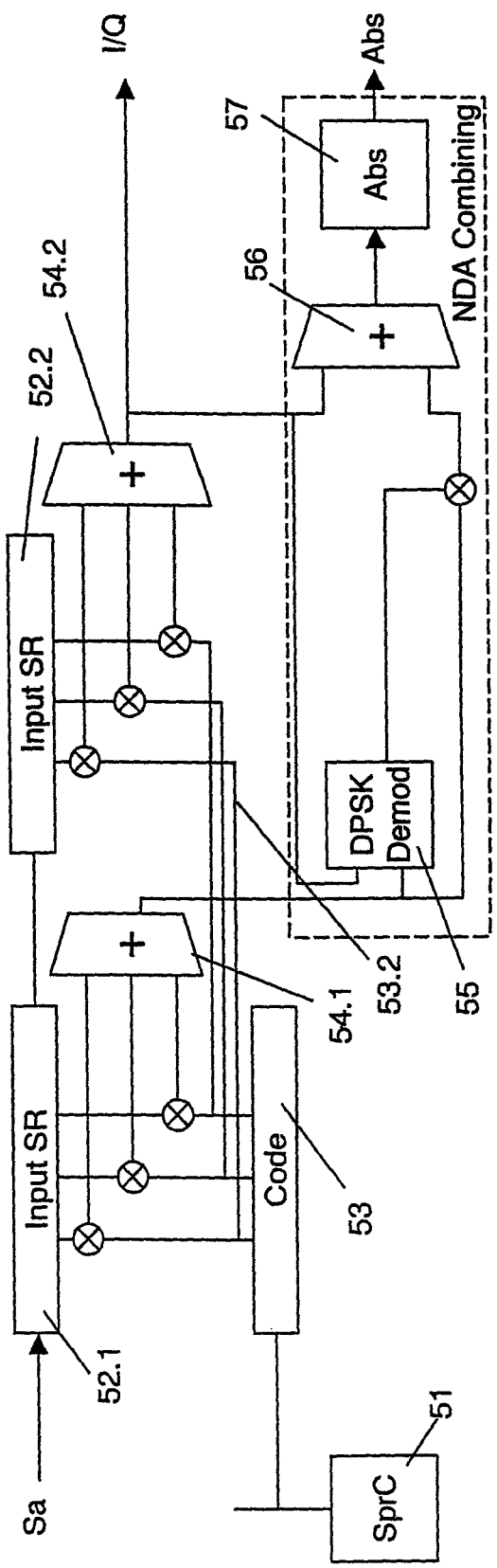
Figure 5:
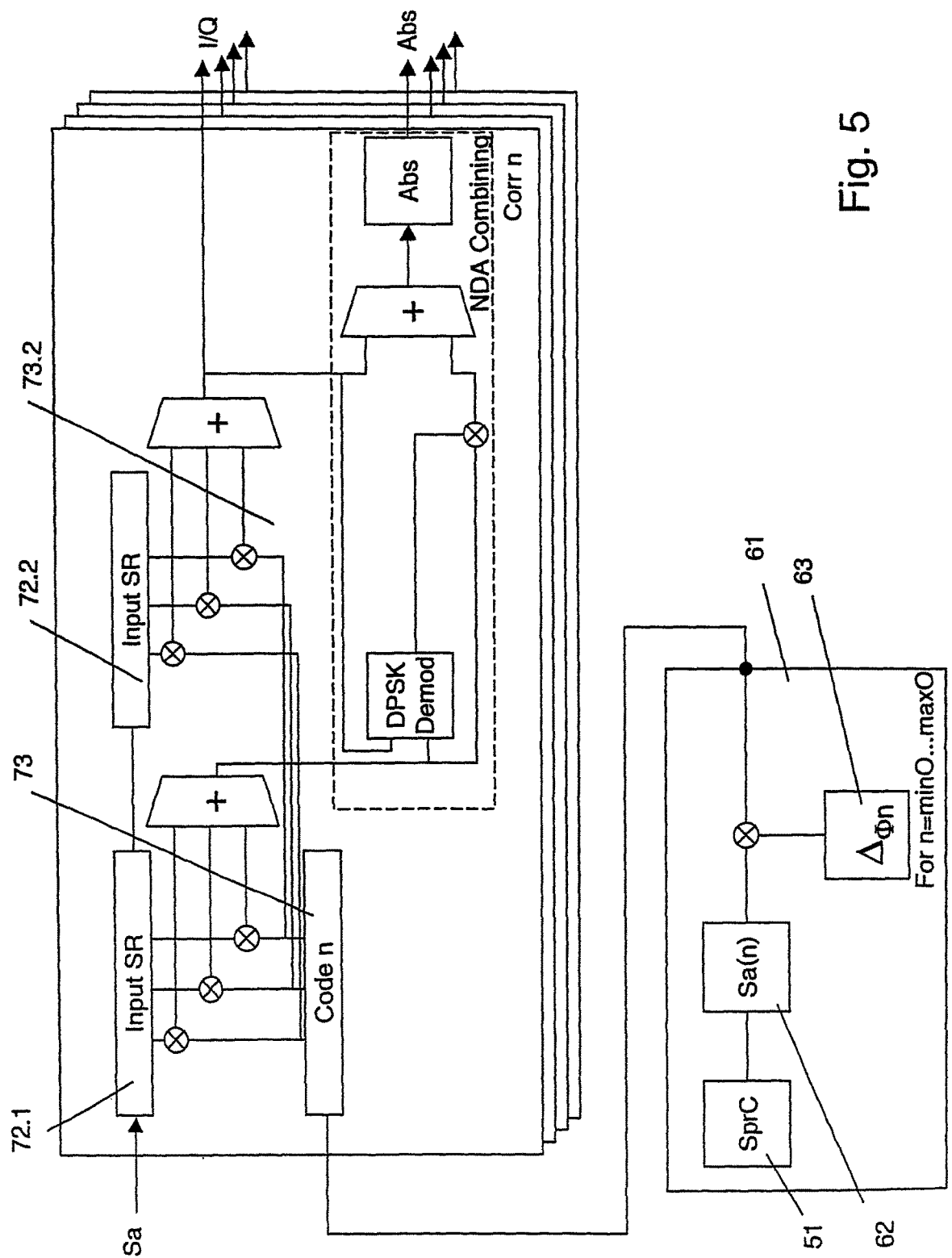
Figure 6:
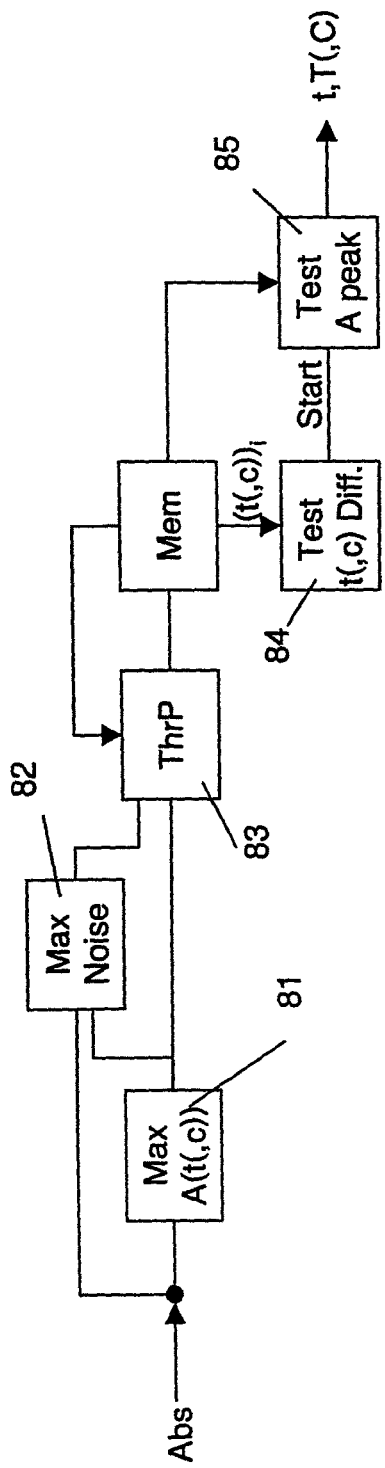

It is shown in FIGS. 4 and 6 as well as—as a variant to FIG. 4-FIG. 5, how the method step of the acquisition may be implemented using a combining which is not data-aided.

The sampling signal Sa according to FIG. 4 is correlated with the predefined chipping code signal which is produced by a chipping code generator 51. The samplewise multiplication and addition of the results, in the ideal case of noise-free signals with a known carrier signal phase relation, results in the transferred code bit (or the transferred code bit sequence for codes of more than one chip), when the sampled signal and the generated chipping code signal are in phase with one another, and results in roughly 0 otherwise (on account of the pseudo-randomness of the chipping code). In the Figure, one may recognise shift registers 52.1, 52.2 which are connected in series, of the length of a chipping code period (i.e. in the most preferred case, corresponding to a code bit period) for the correlation of the sampling signal with the chipping code.

Figure 9:
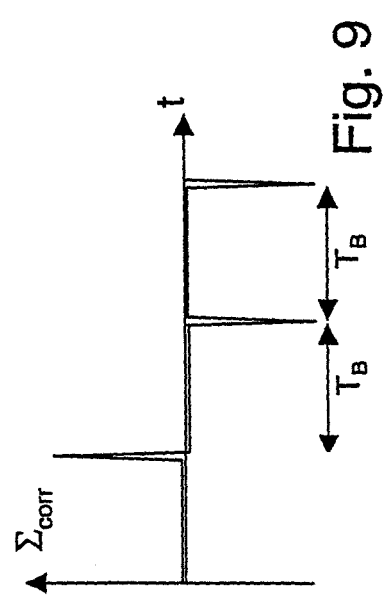
Figure 11:
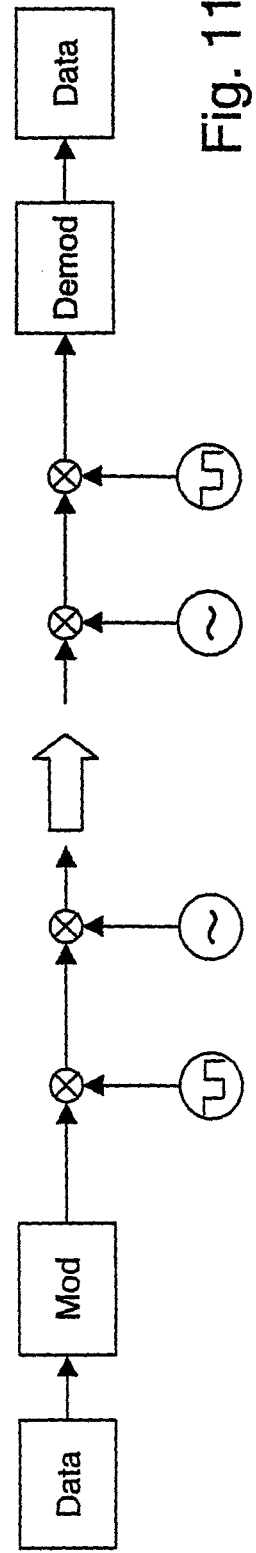

For this, the sampling values are multiplied value-by-value with the values of a register 53 containing the code. This gives two multiplications per chip, when the sampling frequency corresponds to double the chipping frequency. With an adequately favourable signal-to-noise ratio, it is sufficient, in each case to use one shift register for the sampling signal, and a register with the code, in order by way of the absolute value of the added products, to effect the acquisition and the tracking. The contents of the shift register always correspond exactly to a chipping sequence when the obtained sum in the absolute value exceeds a certain threshold value, and with the (complex) sum, it is the case of a code symbol. This is illustrated in FIG. 9—again for the ideal case of signals without noise, and a known constant carrier signal phase relation. The sum $\Sigma_{corr}$ of the results of the value-by-value multiplication—corresponding to the output of the adder 54.1, is shown in the Figure as a function of time. The sequence of code symbols 1, −1, −1 (before the decoding, i.e. the sequence does not necessarily represent a data bit sequence) results from the signal in FIG. 9. Since the distance between the code symbols is known, and corresponds to a bit period $T_b$, after recognising a code symbol for the first time, it is in principle no longer necessary to carry out the correlation with the sample frequency pulsing, but it is sufficient to carry out the computations with a bit frequency pulsing (in FIG. 9 one only computes values of the signals at the peaks, not the data between the peaks), which is described in more detail hereinafter.

For the case of problematic signal-to noise ratios, according to a particularly preferred embodiment of the invention, a combining which is not data-aided is suggested. FIG. 4 illustrates a double combining; the concept may also be extended just as well to triple, quadruple, N-times combining. Several shift registers 52.1, 52.2 are connected in series for this purpose, and in each case are multiplied with the code value-by-value, and the obtained values added. An estimation of the relative (in comparison to the respective next result) "sign" is carried out, in order to be able to add the approximate absolute values of the results. The estimation may, as shown, be effected by a DPSK-demodulation-type operation 55 (sign((Re($r_k \cdot r^*_{k-1}$)))); where "sign" indicates the Signum function, "Re" the real part, "*" the complex conjugation, and $r_k$, $r_{k-1}$, two consecutive values. The result of this comparison provides the relative "sign" of the two values, by way of multiplication of one of the values with the result, both have the same sign, and with a subsequent addition (adder 56), the signal components representing the code symbols are added constructively, independently of their value, whilst the noise determines what an improvement in the signal-to-noise ratio of maximal 3 dB brings. The obtained sum and its absolute value (absolute value formation 57) no longer contain the actual data (on account of the elimination of the relative "sign"). They however may be better used for acquisition purposes on account of the improved signal-to-noise ratio. Alternatively to DPSK-modulation-type operations, other possibilities for estimating the relative sign are also conceivable, for example based on a decision tree. For example, the complex plane may be subdivided into sectors, wherein the estimation is effected by way of a comparison of the sectors in which there are consecutive values.

With a triple- or multiple combining, the DPSK-demodulation-type operation is, for example, effected in each case between the output of a certain adder (for example of the first adder) and in each case the output of all other adders. Alternatively to this, the combining may also be effected in a cascaded manner in different ways, etc.

Depending on the application, it is desirable for the portable apparatus to consist of as inexpensive as possible components. It may then be the case that the clock generator of the portable apparatus is selected integrated in an integrated semiconductor component (chip), and therefore may be relatively inaccurate. It may deviate from the clock generator of the write- and/or read module by up to 2%. According to the state of the art, such a situation may be countered by way of systematically varying the sampling frequency in the manner of a "tuning" procedure, until a high correlation value between the sampled input signal and the stored code is achieved. Such a tuning procedure is also considered for the method according to the invention. It is however important for the important application of "access control", for the complete acquisition procedure not to take up ore than a fraction of a second. A tuning in this time span is not possible when the inaccuracy of the clock generator is too large.

For this reason, a particular variant of the combining and (in combination with FIG. 6) of the acquisition, which is particularly suitable for systems with which either the transmitter or the receiver—or both—have an inaccurate clock generator (no quartz) and with which a rapid acquisition—for example acquisition in real time—is important, is explained by way of FIG. 5. Whereas this variant is explained by way of the example of "ultra-wideband capacitive and/or resistive data transmission via the human body with the help of the spread spectrum method and operating in the burst mode", it is also suitable for any other systems with which comparable requirements play a part.

According to FIG. 5, a code bank is applied in that the stored code 51 is sampled with different sampling frequencies. Specifically, in the example shown here, a sampling of the code 51 with a sampling frequency of 2*(#chips)+1 (per bit length) is simulated in the sampling step 62, wherein n varies between a (negative) minimal value minO and a maximal value maxO. The minimal- and maximal value depend on the clock generator accuracy. In the example with 511 chips/bit and an accuracy of ±2%, minO=−21, maxO=21, so that the correlator length is varied between 1001 and 1043. As mentioned initially, a systematic phase angle rotation results on account of the lacking precise agreement of the clock generator of the transmitter and receiver. This is compensated (phase rotation 63) by way of correction of the phase by a value 2π/n per carrier period (π/n per sample). maxO-minO codes of a length arises, which is in each case 2*(#chips)+n.

It is, of course, not necessary with the particular variant of the correlation described here, for the series of codes (the code bank) to be evaluated in each case by way of a sampling. The code bank may already be stored in the electronics, or be already set up directly in the register 73. Solutions set up with regard to hardware are of course also possible.

A correlation with a method analogous to FIG. 4 is carried out for each code of the code bank. Here too, each correlator may comprise means for a simple combining or a multiple combining (double combining in FIG. 2).

maxO-minO signals as a function of time result on the output side, wherein as in FIG. 4 I/Q the—complex, i.e. phase-information-containing—signal values and Abs absolute values, as the case may be, with the previously described improved signal-to-noise ratio by combining.

The actual acquisition step is represented in FIG. 6. The correlated absolute signal is examined (81) for maxima as a function of time t and—inasmuch as several correlators and thus several signals are present—as a function of the correlator index c (i.e. the frequency difference). Respective maximal values are compared to a threshold value 82 (step 83); a maximal noise which likewise may be determined from the absolute value signal itself, for example from the noise of the other correlators or an averaging over all correlators, serves as a threshold value 82. Values which exceed this threshold value are stored in a data memory element (for example in an FIFO-memory with a few memory spaces), wherein the time t and—as the case may be—the correlator index c are stored. In a further step 84, the time—and correlator difference between stored values are compared. If stored maxima make sense and represent code symbols, they are temporally present in regular intervals of a code length ±few chips, and have an agreeing correlator index or one which deviates by 1 at the most.

Figure 7:
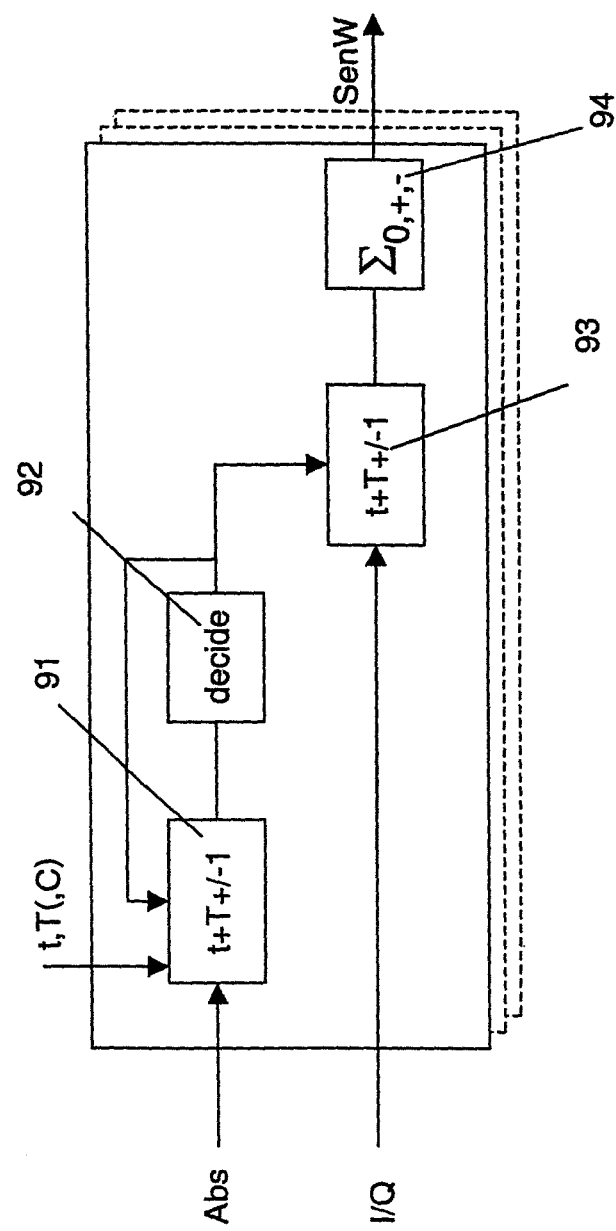

The acquisition method is finished as soon as a series of such meaningful maxima has been found, and the time t, as well as the regular time interval T and, as the case may be, the correlation index c of the "correct" correlator are transferred to a next step, which here is indicated as "tracking" and which is schematically represented in FIG. 7. Tracking is to be understood as a procedure with which the receiver timing tracks the transmitter, see below. For this, the early-late-gating may be used. The regular time interval T corresponds to the bit length (and to a code length, if 1 code per bit was selected). Under certain circumstances, it does not have to be taken from the acquisition step, but rather the known bit- or code length ($T_b$) may be used.

The tracking step comprises one or more tracking receivers, which in each case process the signal of a correlator. Typically, in each case, a tracking receiver is available for the signal of the correlator C selected in the acquisition method, as well as for both adjacent correlators C−1 and C+1. Methods are conceivable where C−1, C and C+1-receivers mutually help the tracking of the correlation peak position. This means that when a tracking receiver loses the signal, it obtains information on the signal position from a different tracking receiver.

The example shown in FIG. 7 uses the gatings for the tracking.

Firstly, the signal absolute value of the extrapolated respective next peak position is compared to its neighbouring values, in each gating receiver. For this, firstly incoming absolute values of the respective correlator are processed. A decimator 91, in each case proceeding from the consolidated point in time t of a peak (representing a code symbol), selects a sequence of three values corresponding to t+T (to the suspected point in time of the next peak), t+T−1 and t+T+1 (the directly adjacent signal values). One differentiates between four cases in a subsequent decider:
1. The largest value of the three data points is the middle one (corresponding to t+T). The peak position was then correctly extrapolated. The position of the next code symbol is t:=t+T.
2. The three values represent a monotonous, descending sequence. The next peak is then earlier than is extrapolated. The position of the next code symbol is t:=t+T−1.
3. The three values represent a monotonously rising sequence. The next peak is then later than is extrapolated. The position of the next code symbol is set as t:t+T+1.
4. The smallest value of the three data points is the middle one (corresponding to t+T). It is then to be assumed that the peak position was completely missed. The peak position t is rejected for the gating receiver concerned. Inasmuch as all gating receivers reject a position once or several times (or inasmuch as only one gating receiver is present, the gating receiver rejects one position), the procedure is completely aborted, and the acquisition step is set into action again, as the case may be, after further correction mechanisms.

From the complex signal values, a second decimator 93 selects that one which in its temporal position t corresponds to the absolute value selected by the decider. One may envisage, apart from the selected signal, also selecting the two temporally adjacent signal values, and summing the three in a subsequent adder 94 (combined). The summing of three temporally adjacent signal values makes sense when double the chipping frequency has been selected as the sampling frequency. A summation over more than three temporally consecutive values may make sense in embodiments with higher sampling frequencies. The gating function may also contain more complex algorithms in these embodiments, wherein one always follows the principle, that the maximum of the peak is searched within a time window, and—if this does not correspond to the prognosed point in time—the prognosis for the peak position is adapted accordingly.

A code symbol or a sequence of code symbols as a function of time, result per grating receiver on the output side.

Figure 8:
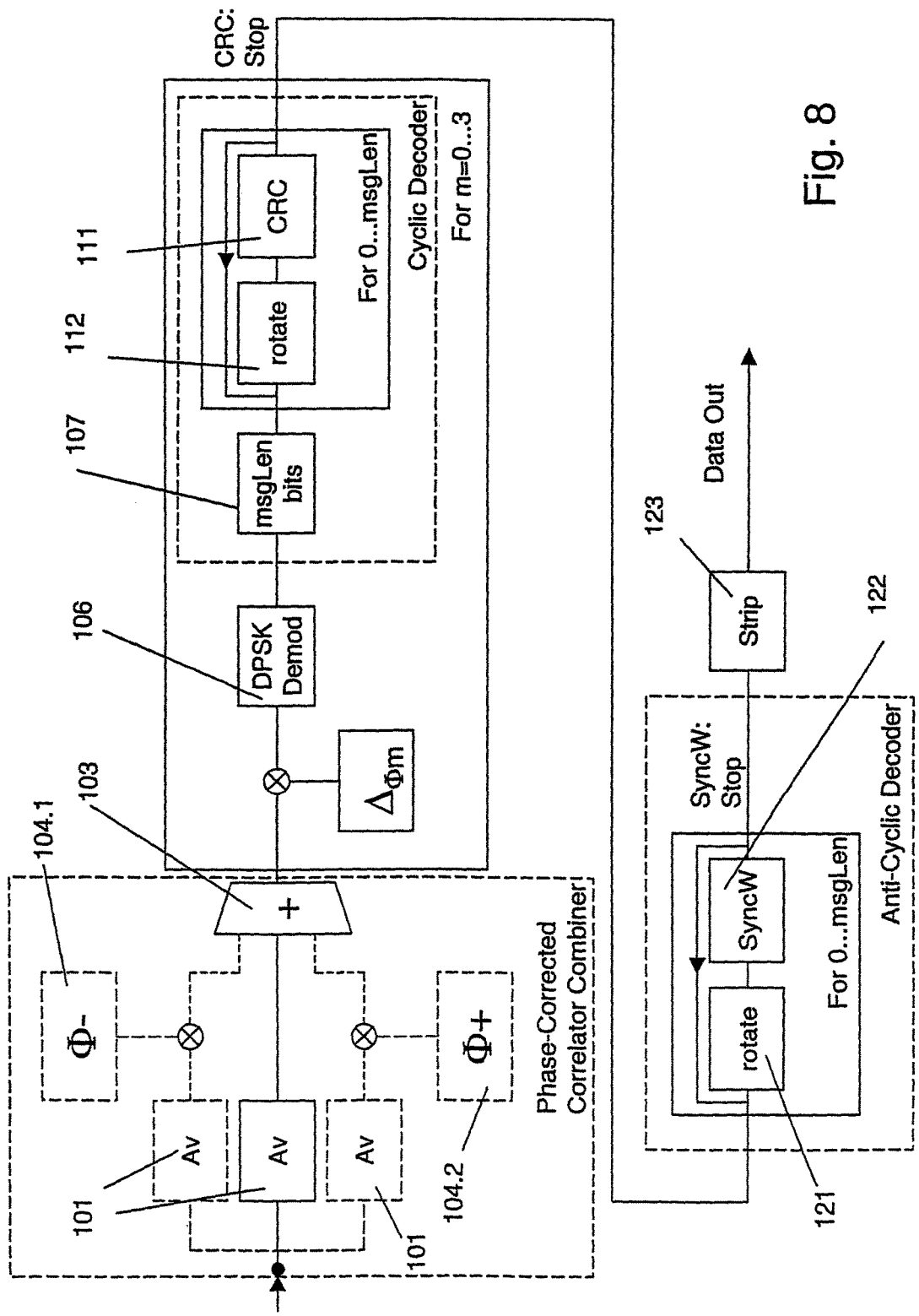

The decoding of the found code symbols is now described by way of FIG. 8. In the case of several gating receivers, the signal-to-noise ratio is improved in a first step—inasmuch as this makes sense—by way of adding the signals which are determined with different gating receivers and which represent the code symbol. For this, firstly it is decided (decision step 101) for each gating receiver, as to whether an evaluation of the code symbols makes sense. Serving as a decision criterion is, for example, the information as to how frequently in the above decision, the situation occurred that the middle data point represents the smallest of the three values (case 4). Inasmuch as that—depending on the selected criterion—has occurred at least once, at least twice, at least thrice, the respective sequence of code symbols is not considered as being significant, and, for example, the determined value is replaced by zero. Otherwise, one uses msgLen+1 code symbols for the further processing (msgLen: number of data bits including sync-word and coding (CRC-) bit(s)). The additional code symbol serves for DPSK-decoding. The three code symbols are combined by an adder 103, wherein an adjustment 104.1, 104.2 of the phases by a value $2\pi/(T_{carr}/\delta^*T_{sa})$ is effected, wherein δ represents the respective deviation of the correlator index assigned to the gating receiver, from the selected "central" correlator C, $T_{carr}=1/f_{carr}$ the reciprocal of the carrier frequency, and $T_{sa}=1/f_{sa}$ the reciprocal of the sampling frequency. In the shown example, δ=−1 for the uppermost line (adjustment 104.1), δ=0 for the middle line, and δ=1 for the lowermost line (adjustment 104.2).

The resulting sequence of summed code symbols may be carried out offline —i.e. not, or not necessarily in data transmission real-time, in contrast to the previously described steps. For this, a bit flow is generated by a DPSK-demodulator 106 from the summed code symbols— these represent phase difference data symbols, on account of the input-side DPSK-modulation 33. Here too, the formula sign(($\text{Re}(r_k \cdot r^*_{k-1})$)) may be applied for the DPSK-demodulation, or another procedure, for example based on a decision tree.

In combination with DPSK-demodulation, the problem of a rotation of the phase by in each case more than π/2 taking place on account of the previously described uncertainty with regard to the phase between two consecutive code symbols may result. The formula sign(Re($r_k \cdot r^*_{k-1}$)) then does not result in the transferred data bit sequence, but a symbol sequence as an artefact which provides no information. For this reason, firstly the symbol sequence of the length msgLen is taken (107) and examined with regard to consistency by way of error detection and error correction, for example error test and/or correction 111. Inasmuch as a cyclically decodable code is used, the error test consists of a single computation with regard to the present symbol frequency, even if the sequence is not known. If this is not the case, the code symbol sequence, as drawn, must be rotated (112) maximally msgLen times, in order to get to the right starting point. As soon as the error test indicates a consistency of the symbol sequence, it is the case of the searched bit sequence. The method with error test 11 and, as the case may be, multiple rotation 112 may also be observed as a cyclic decoding.

Additional measures may be provided, with which the plausibility of the received symbol sequence is examined, for example in that additionally to that which has been previously described, at least one bit is reserved for a consistency check in the data word. The check may be designed as a CRC-test or as an equivalent check. By way of such a check, one may recognise when, for example, one of the decoded code symbols is wrong. By way of this, one may also reduce the probability that a code symbol is corrected in the wrong direction on account of a false error correction.

The symbol sequence is transferred further for further processing (search of the sync-word, described hereinafter). Otherwise, the phase between two code symbols is rotated in each case by $\Delta\phi_m = m\pi/2$ for m=1, 2, 3, and the DPSK-demodulation 106 and the subsequent consistency check is carried out once again, until a consistent symbol sequence— the searched bit sequence—has been found. With regard to the rotation $\Delta\phi_m$, it is the case of a relative rotation, i.e. the phase of each code symbol is rotated by a value $\Delta\phi_m$ further than the previous one, i.e. for example m=1, the phases of consecutive symbols are rotated by 0, $\pi/2$, $\pi$, $3\pi/2$, etc.

With this phase angle rotation $\Delta\phi_m$, it is actually the case of a fine correction, which is carried out as a supplement to the (coarse, i.e. samplewise) phase angle rotation according 63 to FIG. 5, and one takes into account of the fact that even with a found correlator which fits best of all, a small deviation between the transmitter- and receiver-side pulsing is present, which manifests itself in a phase angle rotation between the code symbols. The necessity of a phase angle rotation $\Delta\phi_m$ may be avoided when the correlators of the correlator bank are selected lying closer to one another, than previously described, so that a fine correction is no longer necessary.

It is not known a priori from the data bit sequence, at which bit the data begins, i.e. the desired information may not be deduced a priori. Rather, the actual beginning of the data bit sequence must be determined in a first step, since the data is sent out in a continuously repeated manner, and the starting point in time of the receiver-side signal detection is not known from the beginning. Preferably, a sync-word for the search of the starting point, as has already been described earlier, is used for this. The sync-word is searched 122 by way of the rotation 121 of the bit sequence, said rotation being at the most msgLens times. As soon as it has been found, the sync-word and, as the case may be, the coding bits are removed (strip 123) and the remaining bits are led further as data (data out) for further processing. The method with the search for the sync-word, and, as the case may be, rotation 121 several times, may also be observed as an anti-cyclic (i.e. based on the identification of an exactly defined starting point of the message) decoding. The procedure described here functions when the pattern of the sync-word does not occur in the data bits, or only with a very small probability.

Depending on the embodiment, the error check may only display consistency when the sequence of the code symbols has an unambiguous, stationary starting point (completely anti-cyclic error check). In such a case, the search for the sync-word (and thus the sync-word itself) is not necessary. The starting point is then directly recognised by the error check. In this case, the starting point of the data word results from the code (comma-free code).

One the other hand, the CRC-test may be omitted given the presence of an adequately long sync-word. The consistency check, which is necessary for resolving the previously mentioned uncertainty with DPSK-demodulation due to phase, is then limited to a search of the sync-word bit, which for its part contains the rotation of the bit sequence which is msgLen-times at the most. Consistency is assumed when the sync-word is found, and the starting point is also simultaneously found. This embodiment however entails a reduced security, an erroneous bit is not recognised, and error corrections are not possible. This embodiment is therefore particularly suitable for systems which are robust with regard to data transmission errors.

As already mentioned, the data word may also be cyclically coded. Then, the search for the sync word is omitted.

Figure 10:
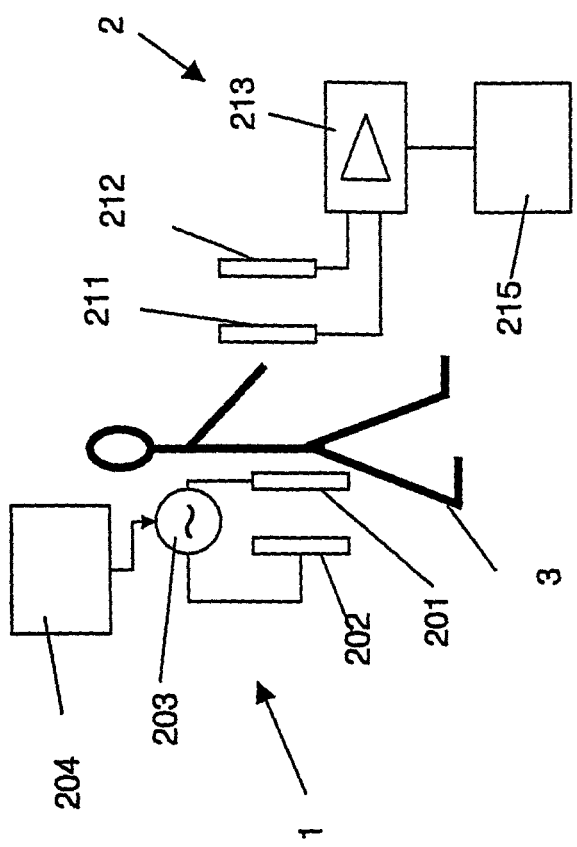

A system according to the invention for the transmission of information is shown in FIG. 10. Data may be exchanged in a capacitive and/or resistive manner between a portable apparatus 1 and a write- and/or read module 2 via the body of a user 3. For this purpose, the portable apparatus 1 comprises electrodes 201, 202 between which a time-dependent electrical voltage may be applied by a signal generator 203. A data memory 204 which contains the data to be transferred, is also illustrated in the figure. The portable apparatus is for example carried by the user on his person, for example in the trouser pocket. With this, the first electrode 201 is closer to the body than the second electrode 202. The first electrode may also directly contact the body under certain circumstances. The write- and/or read module 2 comprises a detector 213 (in the simplest case consisting essentially of an amplifier; the detector may however also be constructed in a more complicated manner and for example comprise discrimination means etc.) which may detect a voltage between a first receiver electrode 211 and a second receiver electrode 212. The first receiver electrode 211 may be designed as an operating- or touch surface. It may be a part of the write- and/or read module, or the module may also only comprise contact means (for example a wire contact) to a metallic body not belonging to the module—for example a door push piece or a door knob—which functions as the first electrode. The second electrode is also not necessarily a constituent of the module itself. If the user 3 is located in the direct vicinity of the first receiver electrode— for example by way of a finger touching it or almost touching it—the a time-dependent voltage may be induced between this and the second electrode, which is dependent on the voltage between the electrodes of the portable apparatus. This principle is known per se from the initially mentioned documents and is not to be explained further here. Voltage signals detected by the detector may be processed by a data acquisition- and decoding unit 215 in the manner described above.

The above-described embodiments are mere examples as to how the invention may be implemented. Other implementations are possible, without having to forgo the essential advantages of the invention. As a first example, it is to be mentioned that the acquisition—with the aid of a correlator bank or also with only a single correlator—is also possible without multiple combining. An estimation of the relative sign, for example by way of a DPSK-demodulation-like operation for determining the relative "sign", is then also not necessary.

Methods of digital data demodulation other than BPSK may be applied, for example QPSK or others. Furthermore, the relation between the code length and the bit length suggested here is in now way a necessity. Other, preferably defined relations between a bit- (symbol-) length and a code are also possible.

Whereas an acquisition by way of combining not aided by data has been described, the invention may also be realised with data-aided acquisition methods It is finally to be mentioned that the terms "portable apparatus" and "write- and/or read module" have been selected for a better understanding of the invention, and do not bindingly fix the arrangement of the respective elements. In particular one may also envisage an apparatus to be worn by the user comprising a receiver for the capacitive-resistive coupling, and serving as a write- and/or read module. Alternatively or supplementary, the apparatus provided with the transmitter may also be consigned to a location at least temporarily, i.e. it does not need to be portable at very point in time.

The invention claimed is:

1. A method for transmitting data between an apparatus and a write- and/or read module, the method comprising the steps of:
    representing the data by a sequence of code symbols;
    modulating the sequence of code symbols by a sequence of chips with a chipping frequency, resulting in a direct sequence spread spectrum signal;
    modulating the direct sequence spread spectrum signal onto a carrier signal to yield a modulated direct sequence spread spectrum signal;
    transmitting the modulated direct sequence spread spectrum signal from the apparatus capacitively and/or resistively to a write- and/or read module,
    wherein the chipping frequency and a carrier frequency of the carrier signal are chosen so that the modulated direct sequence spread spectrum signal has a bandwidth of at least 20% of a center frequency, whereby the transmitted modulated direct sequence spread spectrum signal is an ultra-wideband signal, and so that the center frequency is not larger than 2 MHz.

2. A method according to claim 1, wherein the length of the code symbol is selected as the length of a chipping code.

3. A method according to claim 1, wherein a maximum amplitude of the ultra-wideband signal is equal to or less than 5V.

4. A method according to claim 1, wherein the data to be transmitted is first modulated with a method of digital data modulation, and subsequently spread spectrum modulated.

5. A method according to claim 4, wherein binary phase shift keying is used as a digital data modulation method.

6. A method according to claim 4, wherein the data modulation method is combined with a coding which renders the signal insensitive with respect to absolute phase.

7. A method according to claim 6, wherein the coding in combination with the data modulation method corresponds to a differential phase shift keying.

8. A method according to claim 1, wherein the signal received from the write- and/or read module is sampled, by which means a sequence of sampling values is produced, and that part-sequences of the sequence of sampling values are correlated with a sequence of values which represent the stored chipping code.

9. A method according to claim 8, wherein simultaneously, a plurality of consecutive part-sequences of the sequence of sampling values is correlated in each case with the sequence of values, and that results of the correlation computations are combined for data acquisition.

10. A method according to claim 9, wherein the combination of the results is effected in non-data-aided manner.

11. A method according to claim 10, wherein a value is estimated for the combining, said value being characteristic of the data contents in each case of two results of the correlation computations, and that one of the two results are corrected with this value, and is added to the other of the two results.

12. A method according to claim 9, wherein a sampling frequency is adapted according to the result of the correlation computation, by which means a tuning and/or a fine tuning is achieved.

13. A method according to claim 8, wherein the part-sequence or the part-sequences of the sequence of sampling values is/are correlated in parallel with different sequences of values.

14. A method according to claim 13, wherein the different sequences of values correspond to the chipping code sampled with different sampling frequencies.

15. A method according to claim 13, wherein with an absent correlation between the part-sequence or part-sequences, and each of the different sequences of values, the part-sequence or part-sequences is/are either correlated with a further group of sequences of values which correspond to the chipping code sampled with adapted sampling frequencies, or the sequence of sampling values is produced afresh with a previously presented sampling frequency, and is again correlated with the different sequences of values.

16. A method according to claim 8, wherein the correlation of the received signal with the stored chipping code, with an inverse operation of the digital data modulation method, is used for synchronising.

17. A method according to claim 16, wherein code symbols are taken directly from results of the correlation of the received signal with the stored chipping code.

18. A method according to claim 8, wherein for a timing acquisition, at least two criteria are applied to the results of the correlation computations, of which a first criterion contains a comparison of the absolute value of the results to a noise-level, and a second criterion a comparison of the temporal distance of an absolute value maximum to a last absolute value maximum, to a bit length.

19. A method according to claim 1, wherein the transmitter, in a continuously repeated manner, sends out the data in a manner such that the transfer of the data word begins afresh directly after the end of the transfer of a data word.

20. A method according to claim 1, wherein the data comprises at least one data bit for a data consistency check and/or for an error correction.

21. A method according to claim 1, wherein the data is transferred in a differentially phase-shift-keyed manner, and wherein the signal received by the write- and/or read module after a spread spectrum inverse operation is represented as a symbol sequence, wherein a symbol sequence part-sequence of the length of a data word is checked by way of the data consistency, and a phase angle rotation between in each case two adjacent symbols is carried out given a lacking consistency.

22. A method according to claim 1, wherein the data has a prior known sequence for the synchronisation.

23. A method according to claim 1, wherein the data is transmitted in a cyclically and/or anti-cyclically coded manner.

24. A method according to claim 1, wherein a length of the chipping code corresponds to an integer multiple of a data bit length, and that the spread spectrum modulation is effected synchronously with a data bit sequence representing the data.

25. A method according to claim 1, wherein the ultra-wideband signal is transmitted via the body of a user, or via direct, capacitive and/or resistive coupling between the transmitter and receiver, to the receiver.

26. A system for transmitting data, comprising:
at least one apparatus and at least one write- and/or read module,
wherein the apparatus comprises two electrodes and a signal generator, by way of which a time-dependent electrical voltage may be applied between the two electrodes,
wherein the write- and/or read module comprises a detector with which an electrical voltage or an electrical current may be detected between a first and a second receiver electrode, as well as a data acquisition- and decoding unit for determining data from a signal detected between the first and the second receiver electrode,
wherein the signal generator is programmed and/or activated such that an ultra-wideband signal having a bandwidth of at least 20% of a center frequency, the center frequency not being larger than 2 MHz, may be produced by it, by way of which data is represented using a direct sequence spread spectrum method, and
wherein the data acquisition- and decoding unit comprises means for recovering data from the ultra-wideband signal.

27. An apparatus for transferring data to a write- and/or read module, comprising:
two electrodes and
a signal generator, configured to apply a time-dependent electrical signal between the two electrodes,
wherein the signal generator is programmed and/or activated such that an ultra-wideband signal having a bandwidth of at least 20% of a center frequency, the center frequency not being larger than 2 MHz, may be produced by it, by way of which data is represented using a direct sequence spread spectrum method.

28. A write- and/or read module, the write- and/or read module being configured to receive data, transmitted capacitively and/or resistively by an apparatus, comprising:
a detector with which an electrical voltage or an electrical current may be detected between a first and a second receiver electrode, as well as
a data acquisition- and decoding unit for determining data from a signal detected between the first and the second receiver electrode,
wherein the data acquisition- and decoding unit is configured to recover the data from an ultra-wideband signal having a bandwidth of at least 20% of a center frequency, the center frequency not being larger than 2 MHz, by way of which data is represented using a direct sequence spread spectrum method.

29. A write- and/or read module according to claim 28, further comprising a wake-up circuit configured to awake the data acquisition- and decoding unit as soon as noise- and/or interference level has reached a certain value, and/or as soon as the arrival of a signal is ascertained.

30. A system for transmitting data represented by a sequence of code symbols, the system comprising at least one apparatus and at least one write- and/or read module, wherein the apparatus comprises two electrodes and a signal generator, by way of which a time-dependent electrical voltage may be applied between the two electrodes, and wherein the write- and/or read module comprises a detector with which an electrical voltage or an electrical current may be detected between a first and a second receiver electrode, as well as a data acquisition- and decoding unit for determining data from a signal detected between the first and the second receiver electrode, wherein the signal generator is programmed and/or activated to carry out a method comprising the steps of
representing the data by a sequence of code symbols;
modulating the sequence of code symbols by a sequence of chips with a chipping frequency, resulting in a direct sequence spread spectrum signal;
modulating the direct sequence spread spectrum signal onto a carrier signal to yield a modulated direct sequence spread spectrum signal;
transmitting the modulated direct sequence spread spectrum signal from the portable apparatus capacitively and/or resistively to a write- and/or read module,
wherein the chipping frequency and a carrier frequency of the carrier signal are chosen so that the modulated direct sequence spread spectrum signal has a bandwidth of at least 20% of a center frequency, whereby the transmitted modulated direct sequence spread spectrum signal is an ultra-wideband signal, and so that the center frequency is not larger than 2 MHz.

31. An apparatus for transferring data represented by a sequence of code symbols to a write- and/or read module, the apparatus comprising two electrodes and a signal generator, by way of which a time-dependent electrical signal may be applied between the two electrodes, wherein the signal generator is programmed and/or activated to carry out a method comprising the steps of
representing the data by a sequence of code symbols;
modulating the sequence of code symbols by a sequence of chips with a chipping frequency, resulting in a direct sequence spread spectrum signal;
modulating the direct sequence spread spectrum signal onto a carrier signal to yield a modulated direct sequence spread spectrum signal;
transmitting the modulated direct sequence spread spectrum signal from the portable apparatus capacitively and/or resistively to a write- and/or read module,
wherein the chipping frequency and a carrier frequency of the carrier signal are chosen so that the modulated direct sequence spread spectrum signal has a bandwidth of at least 20% of a center frequency, whereby the transmitted modulated direct sequence spread spectrum signal is an ultra-wideband signal, and so that the center frequency is not larger than 2 MHz.

32. A write- and/or read module for receiving data, which may be transmitted capacitively and/or resistively by an apparatus, comprising a detector with which an electrical voltage or an electrical current may be detected between a first and a second receiver electrode, as well as a data acquisition- and decoding unit for determining data from a signal detected between the first and the second receiver electrode, wherein the data acquisition- and decoding unit comprises means for recovering the data from an ultra-wideband signal having a bandwidth of at least 20% of a center frequency, the center frequency not being larger than 2 MHz, by way of which data is represented using the direct sequence spread spectrum method, and wherein said means for recovering are equipped for de-modulating and de-spreading the ultra-wideband signal.

\* \* \* \* \*

UNITED STATES PATENT AND TRADEMARK OFFICE
CERTIFICATE OF CORRECTION

PATENT NO. : 9,906,263 B2
APPLICATION NO. : 12/295690
DATED : February 27, 2018
INVENTOR(S) : Andreas Stucki et al.

Page 1 of 1

It is certified that error appears in the above-identified patent and that said Letters Patent is hereby corrected as shown below:

Item (73) Assignee:
Change "DROMAKABA SCHWEIZ AG" to --DORMAKABA SCHWEIZ AG--.

Signed and Sealed this
Twelfth Day of June, 2018

Andrei Iancu
*Director of the United States Patent and Trademark Office*